(12) United States Patent
Wang et al.

(10) Patent No.: US 8,670,369 B2
(45) Date of Patent: Mar. 11, 2014

(54) METHOD, RELAY NODE, AND SYSTEM FOR PROCESSING DATA ON RELAY LINK

(75) Inventors: Ke Wang, Shanghai (CN); Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 13/278,859

(22) Filed: Oct. 21, 2011

(65) Prior Publication Data

US 2012/0039245 A1 Feb. 16, 2012

Related U.S. Application Data

(63) Continuation of application No. PCT/CN2009/071377, filed on Apr. 21, 2009.

(51) Int. Cl.
*H04W 80/02* (2009.01)
*H04B 7/14* (2006.01)

(52) U.S. Cl.
USPC ................................ 370/315; 370/469; 455/7

(58) Field of Classification Search
USPC ................................ 370/315, 469, 477; 455/7
See application file for complete search history.

(56) References Cited

U.S. PATENT DOCUMENTS

| 2006/0003696 | A1 | 1/2006 | Diaz et al. |
| 2006/0088009 | A1* | 4/2006 | Gibbs et al. .................. 370/338 |
| 2008/0219203 | A1 | 9/2008 | Chou et al. |
| 2008/0285501 | A1 | 11/2008 | Zhang et al. |
| 2009/0213778 | A1* | 8/2009 | Tao et al. ....................... 370/315 |
| 2010/0150022 | A1* | 6/2010 | Cai et al. ....................... 370/254 |
| 2010/0202343 | A1* | 8/2010 | Hunzinger et al. ........... 370/315 |
| 2010/0260129 | A1* | 10/2010 | Ulupinar et al. .............. 370/329 |
| 2010/0272006 | A1* | 10/2010 | Bertrand et al. .............. 370/315 |
| 2010/0272007 | A1* | 10/2010 | Shen et al. ..................... 370/315 |
| 2013/0107797 | A1* | 5/2013 | Chion et al. ................... 370/315 |

FOREIGN PATENT DOCUMENTS

| CN | 1545253 | A | 11/2004 |
| CN | 1561049 | A | 1/2005 |
| CN | 1717070 | A | 1/2006 |
| CN | 1956353 | A | 5/2007 |
| CN | 1992671 | A | 7/2007 |
| CN | 1996913 | A | 7/2007 |
| CN | 101123789 | A | 2/2008 |
| CN | 101262408 | A | 9/2008 |
| CN | 101384020 | A | 3/2009 |
| EP | 1122925 | A1 | 8/2001 |

OTHER PUBLICATIONS

Office Action issued in corresponding Chinese Patent Application No. 200980105322.x, mailed Feb. 5, 2013.

(Continued)

*Primary Examiner* — Ahmed Elallam
(74) *Attorney, Agent, or Firm* — Brinks Gilson & Lione (57) ABSTRACT

A method, a device, and a system for processing data in a relay link are provided. A method for processing data in a relay link includes: processing, by a relay node by using a first protocol stack, data received by the relay node, where the first protocol stack includes a first MAC layer that is configured to define a media access protocol and an RLC layer that is configured to define a radio link layer, and the first MAC layer is configured to perform tunnel processing on the data. Processing data by using the protocol stacks provided in embodiments of the present invention implements flexible scheduling in the relay link and reduces scheduling overhead in the relay link.

15 Claims, 10 Drawing Sheets

(56) References Cited

OTHER PUBLICATIONS

Written Opinion of the International Searching Authority issued in corresponding PCT Patent Application No. PCT/CN2009/071377, mailed Feb. 4, 2010.

International Search Report issued in corresponding PCT Patent Application No. PCT/CN2009/071377, mailed Feb. 4, 2010.

LTE, "$3^{rd}$ Generation Partnership Project: Technical Specification Group Services and System Aspects; General Packet Radio Service (GPRS) Enhancements for Evolved Universal Terrestrial Radio Access Network (E-UTRAN) Access" (Release 8), 3GPP TS 23.401. V8.5.0, Mar. 2009.

* cited by examiner

METHOD, RELAY NODE, AND SYSTEM FOR PROCESSING DATA ON RELAY LINK

CROSS-REFERENCE TO RELATED APPLICATIONS

This application is a continuation of International Application No. PCT/CN2009/071377, filed on Apr. 21, 2009, which is hereby incorporated by reference in its entirety.

FIELD OF THE INVENTION

The present invention relates to a communications field, and in particular, to a method, a relay node, and a system for processing data in a relay link.

BACKGROUND OF THE INVENTION

In a Long Time Evolution (LTE) radio network, a user equipment (UE) communicates with one or multiple core networks (CNs) through a Radio Access Network (RAN). RAN coverage is divided into geographic areas of cell areas. Each cell area is served by an evolved NodeB (eNodeB or eNB for short). That is, the eNodeB provides radio coverage in the cell area. The eNodeB communicates with a UE in a cell through a radio air interface.

Figure 1:
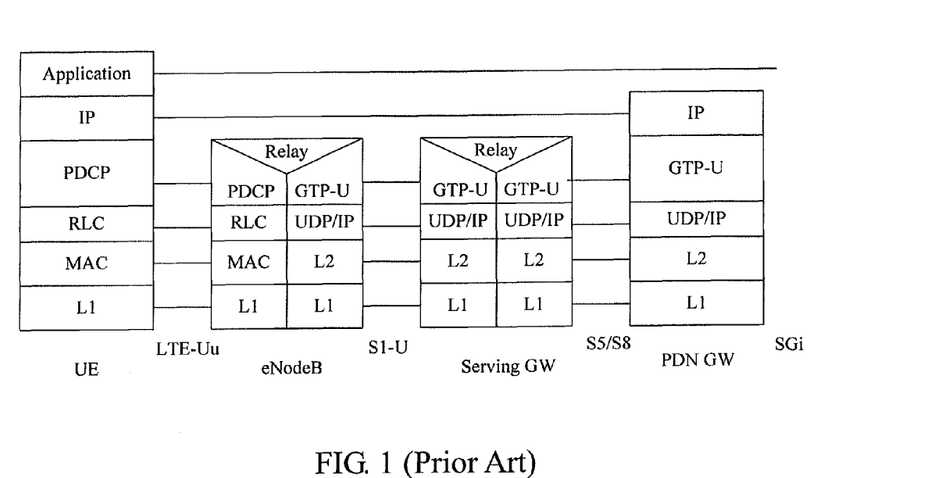
FIG. 1 is a schematic diagram of a user-plane protocol stack in an LTE system.

As shown in FIG. 1, in air interface protocol architecture of LTE, a user-plane protocol stack is used to transmit service data between a UE and an eNodeB. The user-plane protocol stack includes a physical (PHY) layer, a Media Access Control (MAC) layer, a Radio Link Controller (RLC) layer, and a Packet Data Convergence Protocol (PDCP) layer. The PHY layer implements functions such as modulation and encoding of a channel, frequency expansion, and transmission channel multiplexing; the MAC layer mainly implements functions of access control, mapping from a logical channel to a transmission channel, resource scheduling, and hybrid retransmission; the RLC layer implements functions of retransmission mode selection, an automatic repetition request, and encryption; the PDCP layer implements functions of converging and converting of data packets of different formats.

Figure 2:
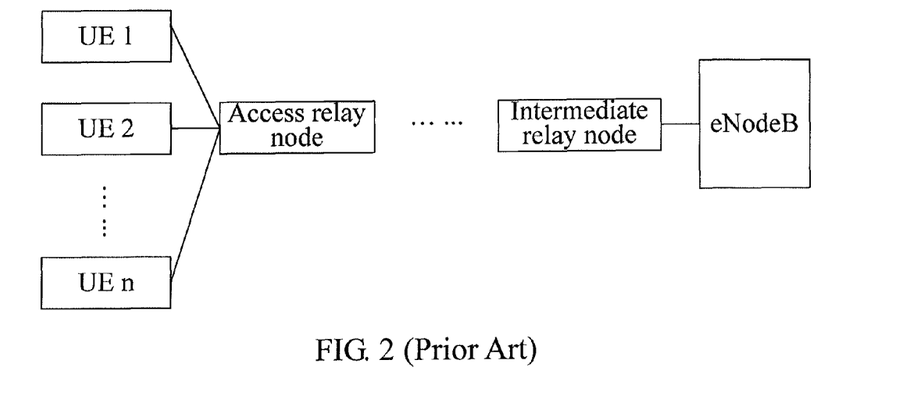
FIG. 2 is a schematic diagram of an LTE-A network after relay is introduced.

Currently, a relay node is introduced to an LTE-Advanced (LTE-A) specification, and multi-hop transmission exists between a UE and an eNodeB. As shown in FIG. 2, in an LTE-A network where a relay node is introduced, an air interface link from the UE to a directly attached access relay node may be called an access link, and an air interface link from the access relay node to the eNodeB may be called a relay link. Multiple intermediate relay nodes may exist between the access relay node and the eNodeB. Therefore, the relay link may include multiple links.

At present, service data transmission from the UE to the eNodeB may use a user-specific based data transmission mode, or may also use a tunnel-based data transmission mode.

Figure 3A:
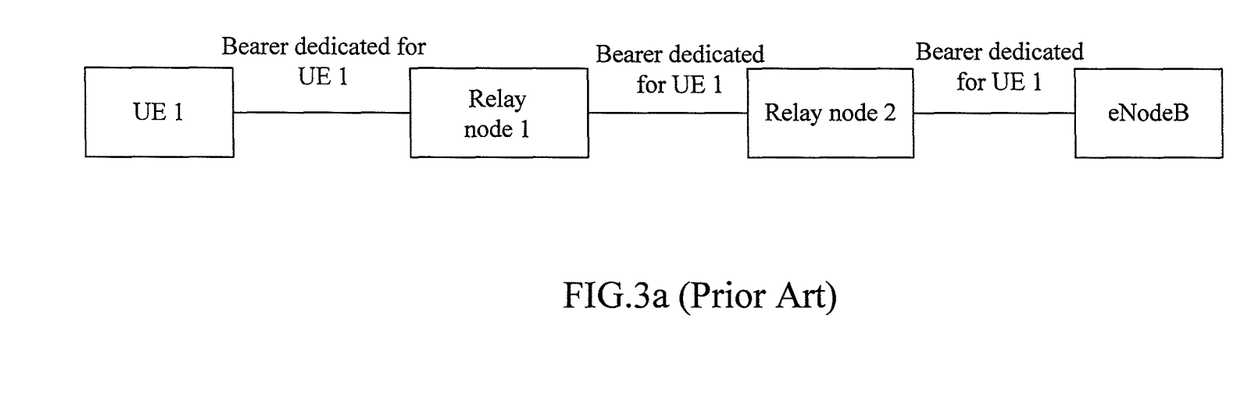
FIG. 3a is a schematic diagram of a user-specific based data transmission mode.
Figure 3B:
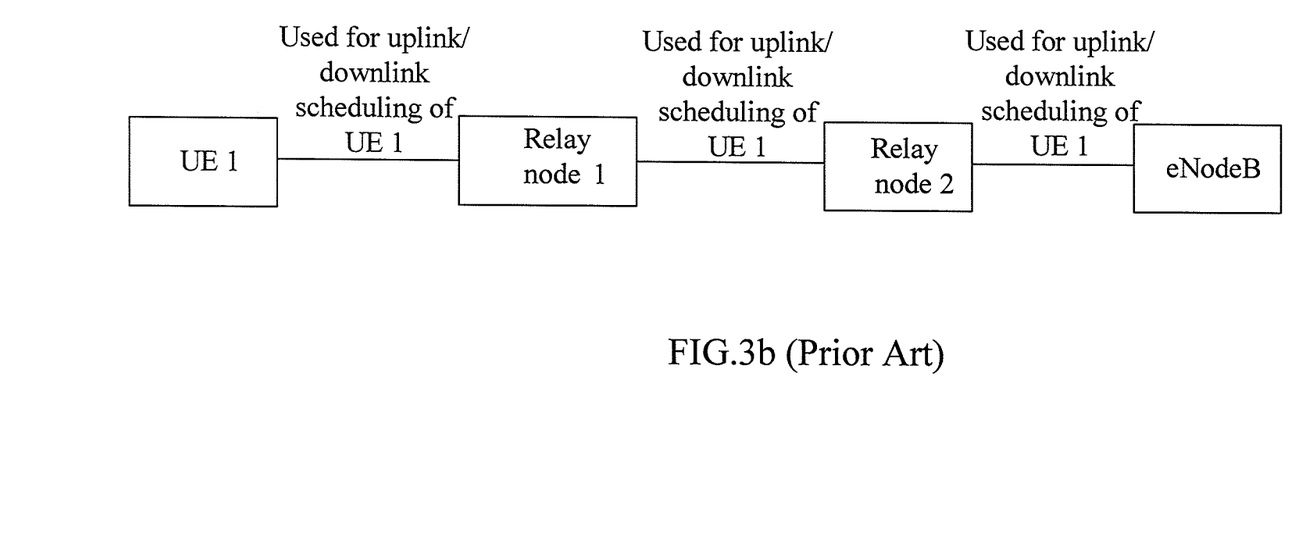
FIG. 3b is a schematic diagram of scheduling overhead of a user-specific based data transmission mode.

Using the user-specific based data transmission mode to implement the service data transmission from the UE to the eNodeB means establishing a dedicated data bearer for a service of a specific UE in the relay link and the access link respectively so as to complete multi-hop transmission of user service data of the UE, as shown in FIG. 3a. In addition, as a dedicated bearer is established for the UE at each hop in UE-specific based data transmission, the relay node needs to schedule these bearers of the UE at each hop to implement data transmission of these bearers, as shown in FIG. 3b.

Figure 3C:
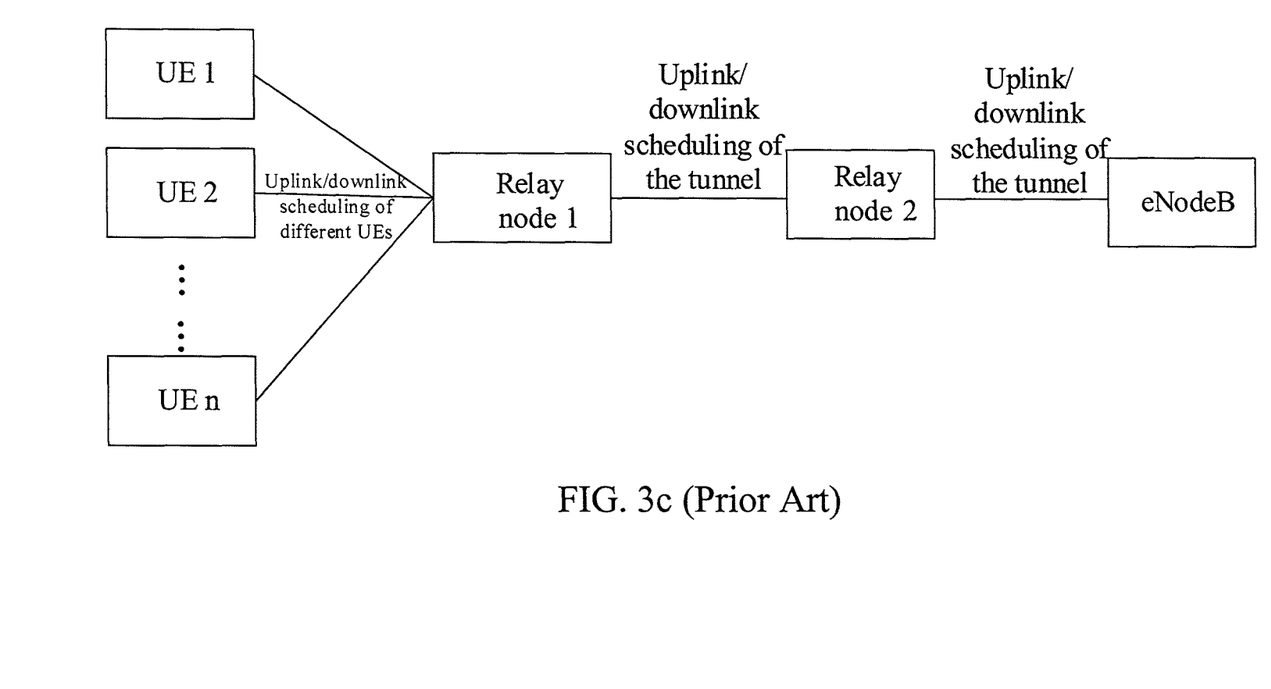
FIG. 3c is a schematic diagram of a tunnel-based data transmission mode.

As shown in FIG. 3c, using the tunnel-based data transmission mode to implement the service data transmission means establishing a tunnel bearer in the relay link. Data of multiple users may be converged in a same tunnel bearer for transmission. Data encapsulation and de-encapsulation of the tunnel are performed at network nodes of both sides, such as the access relay node and the eNodeB, of the tunnel. An intermediate relay node only transparently forwards tunnel data. In addition, a protocol stack layer for data forwarding corresponds to a tunnel encapsulation layer.

SUMMARY OF THE INVENTION

Embodiments of the present invention provide a method, a device, and a system for processing data in a relay link.

Technical solutions provided in embodiments of the present invention include:

a method for processing data in a relay link, including: processing, by a relay node by using a first protocol stack, data received by the relay node, where, the first protocol stack includes a first MAC layer that is configured to define a media access protocol and an RLC layer that is configured to define a radio link protocol, the RLC layer is adjacent to the first MAC layer, the RLC layer is configured to generate an RLC protocol data unit (PDU) for data received by the relay node, and the first MAC layer is configured to perform tunnel processing on the data received by the relay node;

a relay node for processing data in a relay link, including: a first protocol stack module, configured to process data received by the relay node, where the first protocol stack module includes a first MAC layer that is configured to define a media access protocol and an RLC layer that is configured to define a radio link protocol, the RLC layer is adjacent to the first MAC layer, and the first MAC layer is configured to perform tunnel processing on the data received by the relay node;

a system for processing data in a relay link, including: a relay node, configured to process, by using a first protocol stack, data received by the relay node, where the first protocol stack includes a first MAC layer that is configured to define a media access protocol and an RLC layer that is configured to define a radio link protocol, the RLC layer is adjacent to the first MAC layer, the RLC layer is configured to generate an RLC PDU for data received by the relay node, and the first MAC layer is configured to perform tunnel processing on the data received by the relay node;

another method for processing data in a relay link, including: processing, by a relay node by using a second protocol stack, data received by the relay node, where the second protocol stack includes a first PDCP layer that is configured to define a PDCP, and the first PDCP layer is configured to perform tunnel processing on the data received by the relay node;

another relay node for processing data in a relay link, including: a second protocol stack module, configured to process data received by the relay node, where the second protocol stack includes a first PDCP layer that is configured to define a PDCP, and the first PDCP layer is configured to perform tunnel processing on the data received by the relay node; and another system for processing data in a relay link, including: a relay node, configured to process, by using a second protocol stack, data received by the relay node, where the second protocol stack includes a first PDCP layer that is configured to define a PDCP, and the first PDCP layer is configured to perform tunnel processing on the data received by the relay node.

By using the methods in the embodiments of the present invention, the first protocol stack of the relay node performs tunnel processing on data through the RLC layer and the first MAC layer. The RLC layer transmits data to the first MAC layer according to a size of a tunnel packet that can be sent by the first MAC layer. The first MAC layer then performs tunnel processing and generates a tunnel packet. Therefore, through processing of the first protocol stack of the relay node, a transmission efficiency of the tunnel packet can be maximized, thereby implementing flexible scheduling in the relay link. Further, the second protocol stack of the relay node performs tunnel processing on data and generates a tunnel packet through the PDCP layer, RLC layer, and MAC layer. The PDCP layer performs header compression on an IP data stream to process the generated tunnel packet, which reduces the number of MAC PDUs that can be transmitted at a time and that are encapsulated at the MAC layer after the tunnel packet is processed by the RLC layer and the MAC layer. Therefore, a possibility of transmitting one tunnel packet in segments for multiple times is reduced, thereby reducing a transmission delay of the tunnel packet. In addition, as the relay node performs tunnel processing on the data, transmission of data of multiple users in a same tunnel is implemented, thereby reducing scheduling overhead in the relay link.

DETAILED DESCRIPTION OF THE EMBODIMENTS

The inventor of the present invention finds that in an existing user-specific based data transmission mode, a relay node needs to schedule a bearer of a user at each hop, and therefore scheduling overhead in a relay link is increased. In addition, in a radio network, scheduling of a radio air interface determines the amount of data that can be actually transmitted in a tunnel every time in an existing tunnel-based data transmission mode. A MAC layer of a user-plane protocol stack in the relay node obtains an actual size of a transmission block (TB) through the scheduling of the radio air interface. The size of the TB is equal to a size of a MAC PDU that is encapsulated at the MAC layer. According to the preceding features, scheduling is not well considered in the existing tunnel-based data transmission mode; therefore, a size of data that is actually transmitted at the MAC layer may be different from the actual size of the TB obtained by the MAC layer through scheduling of the radio air interface, thereby reducing a relay transmission efficiency. Further, in the existing tunnel-based transmission mode, the amount of data that can be transmitted in the tunnel each time is unknown during tunnel processing on the data. In this case, a data packet that is larger than the amount of data that can be transmitted in the tunnel at a time may be generated. As a result, multiple times of transmission are required for transmitting a complete tunnel packet. De-encapsulation of the tunnel packet needs to be performed in a unit of a complete tunnel packet. In this case, a receiving endpoint can de-encapsulate a tunnel packet only after the tunnel packet is completely transmitted after multiple times and the receiving endpoint receives the complete tunnel packet. As a result, an extra tunnel transmission delay is introduced, and a user service is affected.

Figure 4A:
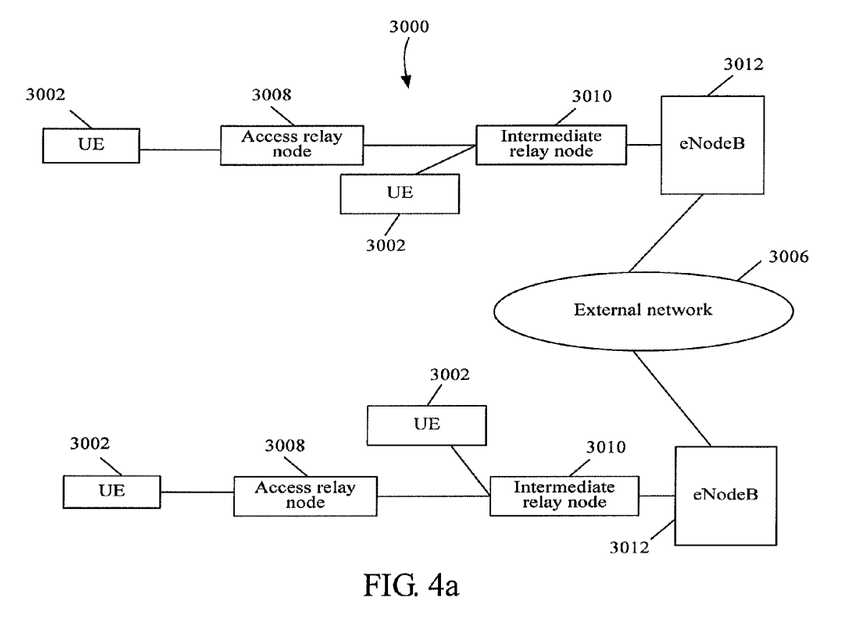
FIG. 4a is a schematic diagram of a system that includes a UE, a relay node, and an eNodeB in a relay link.

The method, the device, and the system in the embodiments of the present invention are described by taking a system 3000 shown in FIG. 4a as an example. The system 3000 may include a UE 3002, an access relay node 3008, an intermediate relay node 3010, and an eNodeB 3012. The eNodeBs 3012 may communicate with each other through an external network. Through a radio communication mode, an eNodeB may communicate with the UE 3002 through the intermediate relay node 3010 and/or the access relay node 3008. The UE may perform radio communication with the eNodeB through the access relay node and/or the intermediate relay node. The eNodeB 3012 may be an eNodeB that can communicate with the intermediate relay node 3010, the access relay node 3008, or the UE 3002 through the radio communication mode. The eNodeB 3012 may include a central processing unit (CPU), a transmitter, a receiver, an input output (I/O) device, and a storage device. In the system 3000, a relay link includes a radio data transmission link from the access relay node to the eNodeB. In the relay link, the access relay node, the intermediate relay node, and the eNodeB may all be collectively called a relay node.

Figure 4B:
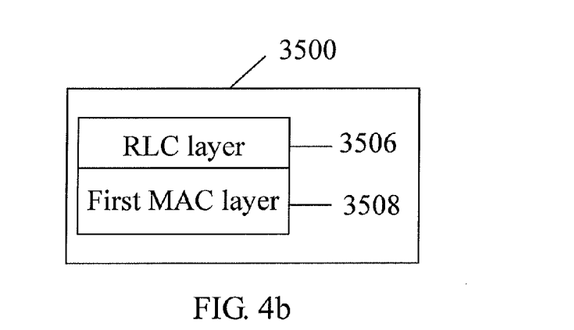
FIG. 4b is a schematic diagram of a first protocol stack according to an embodiment of the present invention.
Figure 4C:
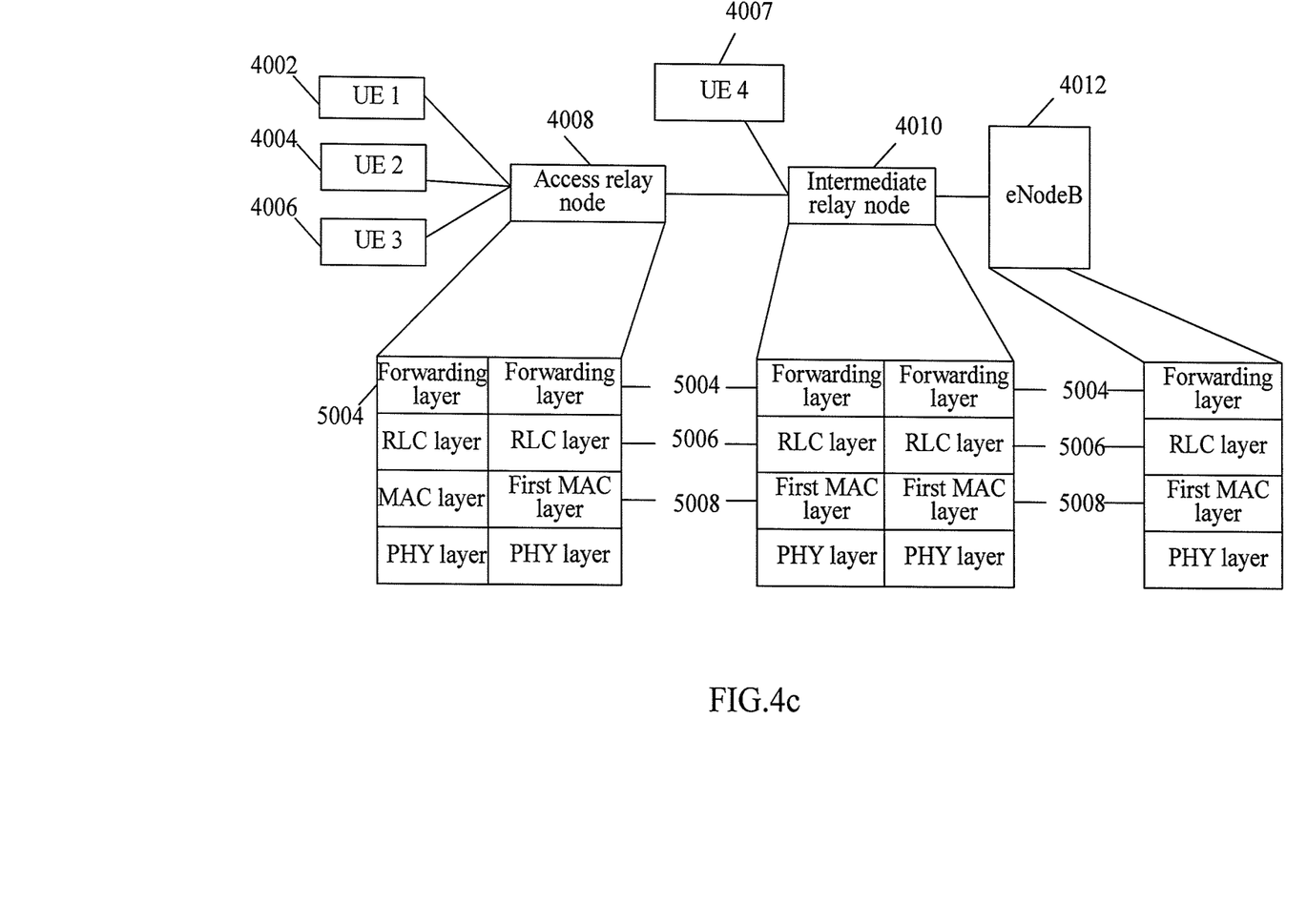
FIG. 4c is a schematic diagram of processing, by a relay node, data in a relay link according to an embodiment of the present invention.

An embodiment of the present invention provides a method for processing data in a relay link. The method includes: a relay node processes, by using a first protocol stack, data received by the relay node. As shown in FIG. 4b, the first protocol stack 3500 includes a first MAC layer 3508 that is configured to define a media access protocol and an RLC layer 3506 that is configured to define a radio link protocol, the RLC layer 3506 is adjacent to the first MAC layer 3508, and the first MAC layer 3508 is configured to perform tunnel processing on the data received by the relay node. In the method in this embodiment of the present invention, the processing, by the relay node by using the first protocol stack, uplink data received by the relay node may be specifically described in the following several scenarios, as shown in FIG. 4c:

In this embodiment of the present invention, for uplink data processing, the performing, by the first MAC layer 3508, tunnel processing on the data may be as follows: The first MAC layer 3508 cascades RLC PDUs that are received from multiple RLC entities of the RLC layer 3506 into an aggregated tunnel MAC PDU, and adds a corresponding user identifier to the PDU to indicate a user that a data load part belongs to, so that the first MAC layer on a network node at the peer side of the tunnel restores data of different users based on the identifier to RLC entities of corresponding users for processing in a procedure of de-encapsulation of the tunnel packet.

If the relay node is an access relay node 4008, the access relay node 4008 forwards data received from one or multiple UEs at a forwarding layer 5004 of the access relay node 4008 by using a protocol stack at a receive end to an RLC layer 5006 of the first protocol stack in the access relay node. The RLC layer 5006 generates different RLC entities for data from different users. A first MAC layer 5008 of the first protocol stack in the access relay node schedules a radio air interface of the access relay node 4008 by using a next-hop node of the access relay node, that is, an intermediate relay node 4010, to obtain an actual size of a TB, where the size of the TB is equal to a size of a MAC PDU that is encapsulated by the first MAC layer 5008. The first MAC layer 5008 divides this TB into several parts and allocates these parts to an RLC entity of the RLC layer 5006. The RLC entity of the RLC layer 5006 constructs a corresponding RLC PDU based on the allocated resource, and sends the RLC PDU to the first MAC layer 5008. A size of a tunnel packet that is generated after the first MAC layer 5008 performs tunnel processing by using the RLC PDU matches the size of the TB. Therefore, transmission efficiency of a tunnel packet that is generated after data is processed by the first protocol stack in the access relay node 4008 may be maximized. In addition, as the first protocol stack uses the first MAC layer 5008 to perform tunnel processing on the data, transmission of data of multiple users in the same tunnel is implemented and scheduling overhead in the relay link is reduced. Further, in this scenario, the forwarding layer 5004 may be a PDCP layer that is configured to define a PDCP, and the PDCP layer forwards data; the forwarding layer may also be a PDCP layer that is configured to define the PDCP and a first IP layer that is configured to define a user network protocol, the PDCP layer is above the RLC layer 5006, and the first IP layer is above the PDCP layer, where the first IP layer is configured to forward data.

If a first relay node is the intermediate relay node 4010, the first MAC layer 5008 of the first protocol stack at a data receive end of the intermediate relay node 4010 de-encapsulates a tunnel packet that is sent by a previous hop relay node, that is, the access relay node 4008. In addition, if more user data, for example, user data that is sent by the UE 4007, needs to be transmitted through the intermediate relay node 4010, the intermediate relay node 4010 may process data that is obtained by de-encapsulating the tunnel packet received from the previous hop relay node 4008 together with the more user data that needs to be transmitted. The more user data that needs to be transmitted may be, for example, user data that is sent from a UE 4007 to the intermediate relay node 4010. The intermediate relay node 4010 uploads the data obtained by de-encapsulating the tunnel packet and the user data that needs to be further transmitted to the RLC layer 5006. The RLC layer 5006 generates different RLC entities for data from different users. The first protocol stack at the data receive end transmits, by using the RLC entities, data to the forwarding layer 5004 that is above the RLC layer 5006. The forwarding layer 5004 forwards the data to the RLC layer 5006 of the first protocol stack at the data transmit end. The intermediate relay node schedules the radio air interface of the intermediate relay node 4010 by using the next-hop relay node, such as an eNodeB 4012, to obtain the actual size of the TB. The size of this TB is equal to the size of the MAC PDU that is encapsulated by the first MAC layer 5008 of the first protocol stack at the data transmit end. The first MAC layer 5008 of the first protocol stack at the data transmit end divides this TB into several parts, and allocates these parts to different RLC entities of the RLC layer 5006 of the first protocols tack at the data transmit end. An RLC entity of the RLC layer 5006 constructs a corresponding RLC PDU according to a size of an allocated part of the TB, and sends the RLC PDU to the first MAC layer 5008 of the first protocol stack at the data transmit end. After the first MAC layer 5008 performs tunnel processing on the RLC PDU, a tunnel packet is generated. A size of this tunnel packet matches the size of the TB that is obtained by scheduling of the radio air interface of the intermediate relay node by the intermediate relay node 4010 through the next-hop relay node 4012 of the intermediate relay node 4010. Therefore, the transmission efficiency of the tunnel packet that is generated after the data that is processed by the first protocol stack in the intermediate relay node may be maximized. In addition, as the first protocol stack uses the first MAC layer 5008 to perform tunnel processing on the data, transmission of data of multiple users in the same tunnel is implemented and scheduling overhead in the relay link is reduced. In this scenario, the forwarding layer 5004 may be the PDCP layer that is configured to define the PDCP, and the PDCP layer forwards the data. Further, the first protocol stack in the intermediate relay node 4010 includes the first MAC layer that is configured to perform tunnel processing on the data. Therefore, during tunnel transmission in the relay link from the access relay node 4008 to the eNodeB 4012, the user data that can be transmitted in the tunnel may be not confined to user data that is processed at a tunnel start end such as the access relay node 4008, but user data from the UE 4007 may further be carried.

Figure 5A:
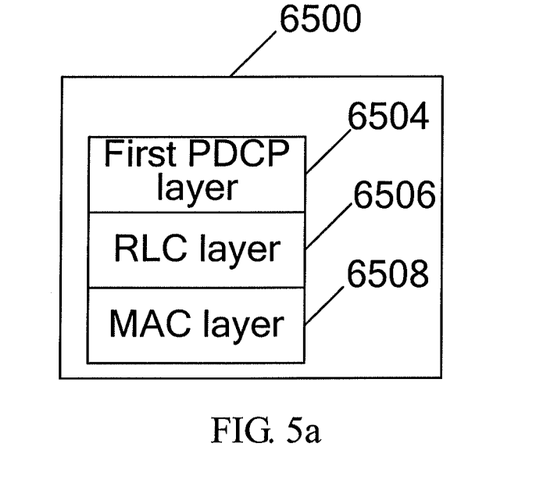
FIG. 5a is a schematic diagram of a second protocol stack according to an embodiment of the present invention.

An embodiment of the present invention provides another method for processing data in a relay link. The method includes: processing, by a relay node by using a second protocol stack, data received by the relay node. As shown in FIG. 5a, the second protocol stack 6500 includes a first PDCP layer 6504 that is configured to define a PDCP, where the first PDCP layer 6504 is configured to perform tunnel processing on the data received by the relay node. Further, the second protocol stack 6500 further includes a MAC layer 6508 that is configured to define a media access protocol and an RLC layer 6506 that is configured to define a radio link protocol, where the RLC layer 6506 is adjacent to the MAC layer 6508, and the RLC layer 6506 is further adjacent to the first PDCP layer 6504.

Figure 5B:
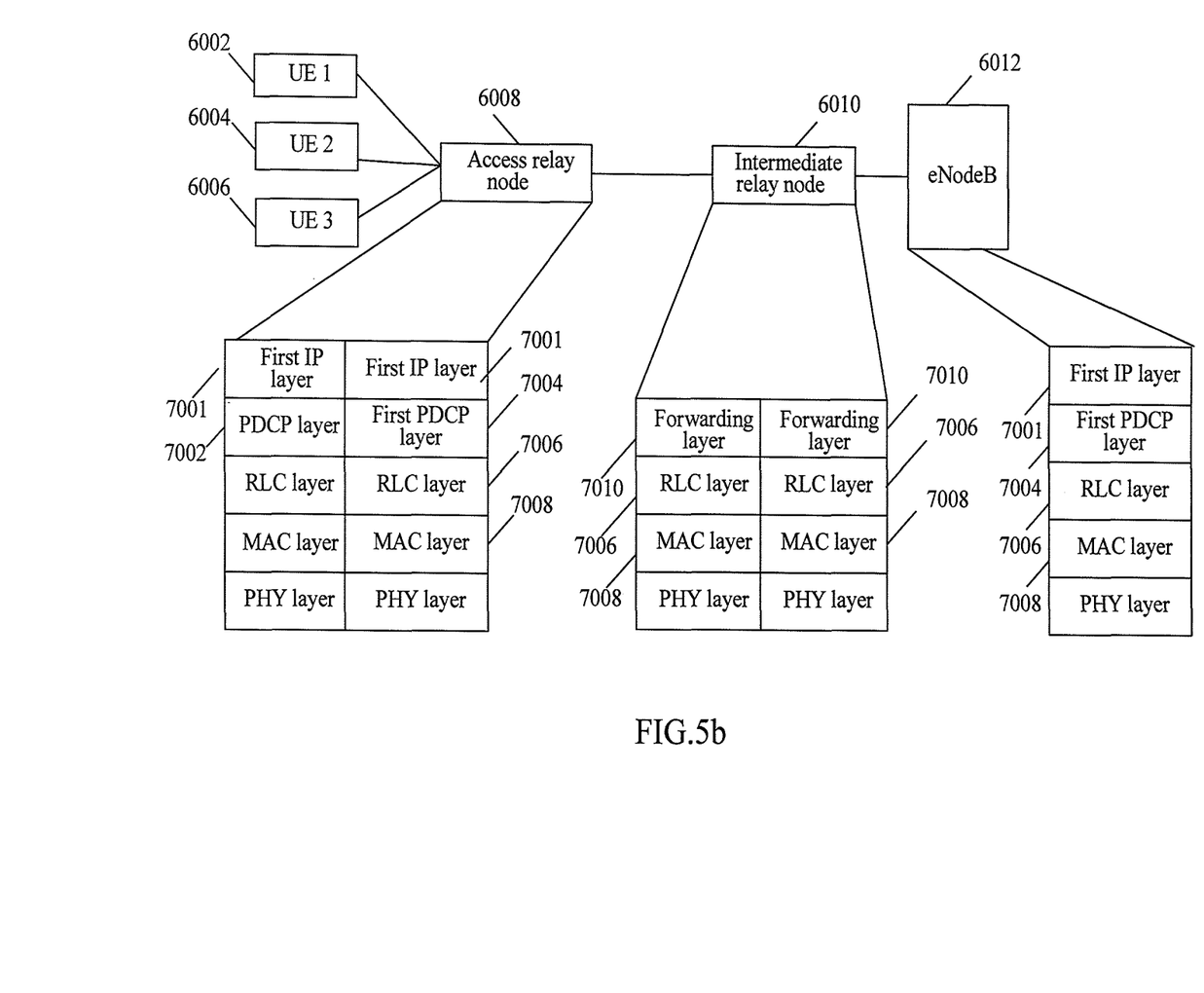
FIG. 5b is a schematic diagram of processing, by a relay node, data in a relay link according to an embodiment of the present invention.

In the method in this embodiment of the present invention, the processing, by the relay node by using the second protocol stack, uplink data received by the relay node may be specifically described in the following several scenarios, as shown in FIG. 5b:

When the relay node is an access relay node 6008, for the uplink data that is sent from UEs 6002, 6004, and 6006, the access relay node 6008 forwards, at a first IP layer 7001 of a protocol stack at a data receive end by using the protocol stack at the data receive end, the data that is received from UE 6002, UE 6004, and UE 6006 to the first IP layer 7001 of the second protocol stack in the access relay node. The first IP layer 7001 is configured to define a user network protocol. When receiving the forwarded data of multiple users, the first IP layer 7001 of the second protocol stack sends the data to a first PDCP layer 7004 that is configured to define the PDCP for processing. The first PDCP layer 7004 of the second protocol stack is configured to define a network protocol, and perform tunnel processing on the forwarded data. The tunnel processing includes using a pre-designed upper layer interface in the first PDCP layer 7004 to processing user data from the UEs 6002, 6004, and 6006 in the same PDCP entity of the first PDCP layer 7004, and performing header compression on IP data streams of the multiple UEs to distinguishing between data of different users in a tunnel. The data of multiple UEs that is processed by the same PDCP entity of the first PDCP layer 7004 is transferred to the same RLC entity. Therefore, the data that is sent from the access relay node 6008 may be regarded, in a relay procedure, as data that is sent from a same endpoint, that is, data that is sent from one end of the tunnel. The first PDCP layer 7004 performs header compression on the IP data streams of UEs 6002, 6004, and 6006 at the same time in one PDCP entity to implement tunnel processing, rather than constructing a tunnel packet by using a cascading and aggregation method. Therefore, a possibility of generating an over-sized tunnel packet is reduced. Accordingly, a possibility of transmitting one tunnel packet in segments for multiple times is reduced, thereby reducing a transmission delay of the tunnel packet. The tunnel packet that is processed by the first PDCP layer 7004 may be de-encapsulated by using the same first PDCP layer 7004 on a relay node in the relay link. For example, in an eNodeB 6012, use the first PDCP layer 7004 of the second protocol stack to perform decompression processing on the IP data streams to obtain IP data streams of different users. In addition, after being processed by the first PDCP layer 7004 of the second protocol stack in the access relay node 6008 and by a corresponding RLC entity of an RLC layer 7006, the tunnel packet becomes an RLC PDU. A MAC layer 7008 of the second protocol stack in the access relay node 6008 schedules, by using a next-hop node of the access relay node, a radio air interface of the access relay node to obtain an actual size of a TB. The size of the TB is equal to a size of a MAC PDU that is encapsulated by the MAC layer 7008. The MAC layer 7008 divides the TB into several parts and allocates these parts to the RLC layer 7006. Therefore, the RLC entity of the RLC layer 7006 constructs a corresponding RLC PDU according to the allocated resources, and sends the RLC PDU to the MAC layer 7008. The MAC layer 7008 uses this RLC PDU to generate a MAC PDU that needs to be transmitted. The first PDCP layer 7004 performs header compression on IP data streams, which may reduce a possibility of generating a large tunnel packet. Therefore, when the RLC-layer and the MAC-layer process the tunnel packet processed by the first PDCP layer 7004, a possibility of encapsulating the tunnel packet in different MAC PDUs may be reduced, thereby reducing the possibility of transmitting one tunnel packet in segments for multiple times, and the transmission delay of the tunnel packet. Therefore, after being processed by the first PDCP layer 7004 of the second protocol stack in the access relay node 6008, data is further processed by the RLC layer and the MAC layer to generate the corresponding MAC PDU that needs to be transmitted, which improves transmission efficiency of data. In addition, the second protocol stack uses the first PDCP layer 7004 to perform tunnel processing on the data, thereby reducing scheduling overhead in the relay link.

If the relay node is the eNodeB 6012, the eNodeB 6012 sends the data that is sent from an intermediate relay node 6010 and processed by the MAC layer 7008 and RLC layer 7006 in the second protocol stack at the data receive end to an upper layer of the RLC layer, that is, the first PDCP layer 7004, to perform de-encapsulating processing on data.

Figure 6:
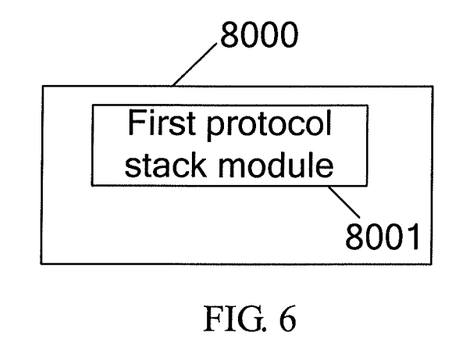
FIG. 6 is a schematic diagram of a module of a relay node that processes data in a relay link according to an embodiment of the present invention.

As shown in FIG. 6, an embodiment of the present invention provides a relay node 8000 for processing data in a relay link. The relay node 8000 includes a first protocol stack module 8001.

The first protocol stack module 8001 is configured to process data received by the relay node 8000. The first protocol stack module includes a first MAC layer that is configured to define a media access protocol and an RLC layer that is configured to define a radio link protocol, the RLC layer is adjacent to the first MAC layer, and the first MAC layer is configured to perform tunnel processing on the data received by the first protocol stack module 8001.

Further, the first MAC layer being configured to perform tunnel processing on the data received by the relay node 8000 includes: The first MAC layer is configured to generate a tunnel packet based on an RLC PDU that is generated by the RLC layer; or, when the data received by the relay node 8000 is a tunnel packet, the first MAC layer is configured to de-encapsulate the tunnel packet received by the relay node 8000.

Further, the first protocol stack module 8001 includes: a forwarding layer that is configured to perform data forwarding, where the forwarding layer is adjacent to the RLC layer.

Further, the forwarding layer is a PDCP layer that is configured to define a PDCP.

Further, the forwarding layer includes: a PDCP layer that is configured to define a PDCP and a first IP layer that is configured to define a user network protocol, where the first IP layer is configured to forward data.

Further, the relay node 8000 is an access relay node or an intermediate relay node.

Figure 7:
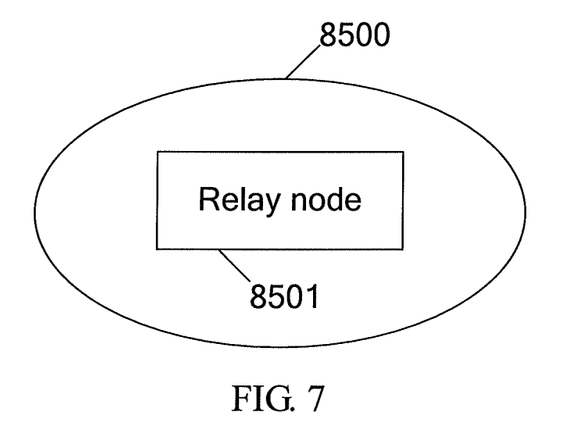
FIG. 7 is a schematic diagram of a system that processes data in a relay link according to an embodiment of the present invention.

As shown in FIG. 7, an embodiment of the present invention provides a system 8500 for processing data in a relay link. The system includes: a relay node 8501.

The relay node 8501 is configured to process, by using a first protocol stack, data received by the relay node 8501, where, the first protocol stack includes a first MAC layer that is configured to define a media access protocol and an RLC layer that is configured to define a radio link protocol, the RLC layer is adjacent to the first MAC layer, the RLC layer is configured to generate an RLC PDU for data received by the relay node 8501, and the first MAC layer is configured to perform tunnel processing on the data received by the relay node 8501.

Further, the first MAC layer being configured to perform tunnel processing on the data received by the relay node 8501 includes: The first MAC layer is configured to generate a tunnel packet based on an RLC PDU that is generated by the RLC layer; or, when the data received by the relay node 8501 is a tunnel packet, the first MAC layer is configured to de-encapsulate the tunnel packet received by the relay node 8501.

Further, the first protocol stack includes: a forwarding layer that is configured to perform data forwarding, where the forwarding layer is adjacent to the RLC layer.

Further, the forwarding layer is a PDCP layer that is configured to define a PDCP.

Further, the forwarding layer includes: a PDCP layer that is configured to define a PDCP and a first IP layer that is configured to define a user network protocol, where the first IP layer is configured to forward data.

Further, the relay node 8501 is an access relay node or an intermediate relay node.

Figure 8:
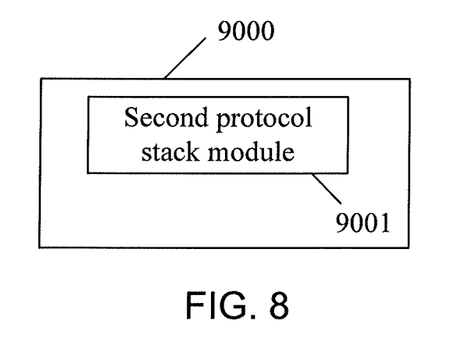
FIG. 8 is a schematic diagram of another module of a relay node that processes data in a relay link according to an embodiment of the present invention.

As shown in FIG. 8, an embodiment of the present invention provides a relay node 9000 for processing data in a relay link. The relay node 9000 includes a second protocol stack module 9001.

The second protocol stack module 9001 is configured to process data received by the relay node 9000, where the second protocol stack includes a first PDCP layer that is configured to define a PDCP, and the first PDCP layer is configured to perform tunnel processing on the data received by the relay node 9000.

Further, the second protocol stack further includes a MAC layer that is configured to define a media access protocol and an RLC layer that is configured to define a radio link protocol, where the RLC layer is adjacent to the MAC layer, and the RLC layer is further adjacent to the first PDCP layer.

Further, the second protocol stack further includes a first IP layer that is configured to define a user network protocol, where the first IP layer is configured to forward the data received by the relay node 9000.

Further, the relay node 9000 is an access relay node or an eNodeB.

Figure 9:
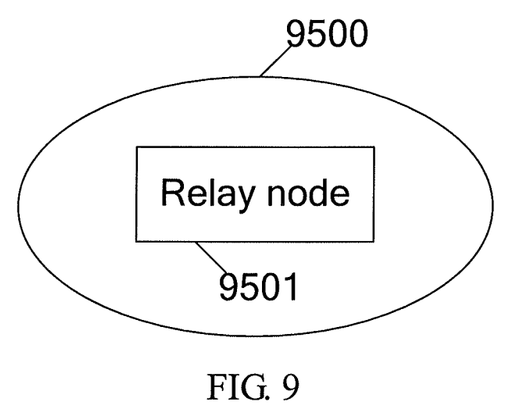
FIG. 9 is a schematic diagram of another system that processes data in a relay link according to an embodiment of the present invention.

As shown in FIG. 9, an embodiment of the present invention provides a system 9500 for processing data in a relay link. The system 9500 includes: a relay node 9501.

The relay node 9501 is configured to process, by using a second protocol stack, data received by the relay node 9501, where the second protocol stack includes a first PDCP layer that is configured to define a PDCP, and the first PDCP layer is configured to perform tunnel processing on the data received by the relay node 9501.

Further, the second protocol stack further includes a MAC layer that is configured to define a media access protocol and an RLC layer that is configured to define a radio link protocol, where the RLC layer is adjacent to the MAC layer, and the RLC layer is further adjacent to the first PDCP layer.

Further, the second protocol stack further includes a first IP layer that is configured to define a user network protocol, where the first IP layer forwards the data received by the relay node 9501.

Further, the relay node 9501 is an access relay node or an eNodeB.

To facilitate description, the preceding embodiments of the present invention take a scenario of processing uplink data as an example for description. It can be understood by those skilled in the art, however, that the protocol stacks that are provided in the methods, relay nodes, and systems for processing data in the relay link in the embodiments of the present invention may also apply to a scenario of processing downlink data.

The methods, relay nodes, and systems in the preceding embodiments of the present invention may be used in an LTE system where a relay link exists.

It is understandable to those skilled in the art that all or part of the steps in the methods of the foregoing embodiments may be performed through relevant hardware instructed by a program. The program may be stored in a computer-readable storage medium, such as a floppy disk, a hard disk, or a Compact Disk-Read Only Memory (CD-ROM) of a computer.

The preceding is merely embodiments of the present invention. The protection scope of the present invention, however, is not limited thereto. Changes or replacements readily apparent to persons skilled in the prior art within the technical scope of the present invention should fall within the protection scope of the present invention. Therefore, the protection scope of the present invention is subject to the appended claims.

What is claimed is:

1. A method for processing data in a relay link, comprising:
processing, by a relay node by using a first protocol stack, data received by a forwarding layer of the relay node, wherein the first protocol stack comprises a first Media Access Control (MAC) layer that is configured to define a media access protocol and a Radio Link Control (RLC) layer that is configured to define a radio link protocol, the RLC layer is adjacent to the first MAC layer, the RLC layer is configured to generate a plurality of RLC protocol data units (PDUs) with a corresponding user identifier for the data received by the forwarding layer of the relay node, wherein the forwarding layer is different from the RLC layer and the first MAC layer, and the first MAC layer is configured to perform tunnel processing on the data received by the forwarding layer of the relay node, wherein each of the plurality of RLC PDUs are generated according to resources allocated by the first MAC and the plurality of RLC PDUs are aggregated according to the corresponding user identifier to form a MAC PDU tunnel packet for the tunnel processing on the received data.

2. The method according to claim 1, wherein, the first MAC layer being configured to perform tunnel processing on the data received by the relay node comprises:
the data received by the relay node is a tunnel packet, the first MAC layer is configured to de-capsulate the tunnel packet received by the relay node.

3. The method according to claim 1, wherein the first protocol stack further comprises: a forwarding layer that is configured to perform data forwarding, wherein the forwarding layer is adjacent to the RLC layer.

4. The method according to claim 3, wherein, the forwarding layer is a Packet Data Convergence Protocol (PDCP) layer that is configured to define a PDCP.

5. The method according to claim 1, wherein, the relay node is one of: an access relay node or an intermediate relay node.

6. A relay node for processing data in a relay link, comprising:
a first protocol stack module, configured to: process, by using the first protocol stack, data received by a forwarding layer of the relay node, wherein, the first protocol stack module comprises a first Media Access Control (MAC) layer that is configured to define a media access protocol and a Radio Link Control (RLC) layer that is configured to define a radio link protocol, the RLC layer is adjacent to the first MAC layer, the RLC layer is configured to generate a plurality of RLC protocol data units (PDUs) with a corresponding user identifier for the data received by the forwarding layer of the relay node, wherein the forwarding layer is different from the RLC layer and the first MAC layer, and the first MAC layer is configured to perform tunnel processing on the data received by the forwarding layer of the relay node, wherein each of the plurality of RLC PDUs are generated according to resources allocated by the first MAC and the plurality of RLC PDUs are aggregated according to the corresponding user identifier to form a MAC PDU tunnel packet for the tunnel processing on the received data.

7. The relay node according to claim 6, wherein, the first MAC layer being configured to perform tunnel processing on the data received by the relay node comprises:
the data received by the relay node is a tunnel packet, the first MAC layer is configured to de-capsulate the tunnel packet received by the relay node.

8. The relay node according to claim 6, wherein the first protocol stack module further comprises: a forwarding layer that is configured to perform data forwarding, wherein the forwarding layer is adjacent to the RLC layer.

9. The relay node according to claim 8, wherein, the forwarding layer is a Packet Data Convergence Protocol (PDCP) layer that is configured to define a PDCP.

10. The relay node according to claim 6, wherein, the relay node is one of: an access relay node or an intermediate relay node.

11. A system for processing data in a relay link, comprising:
a relay node, configured to: process, by using a first protocol stack, data received by a forwarding layer of the relay node, wherein, the first protocol stack comprises a first Media Access Control (MAC) layer that is configured to define a media access protocol and a Radio Link Control (RLC) layer that is configured to define a radio link protocol, the RLC layer is adjacent to the first MAC layer, the RLC layer is configured to generate a plurality of RLC protocol data units (PDUs) with a corresponding user identifier for the data received by the forwarding layer of the relay node, wherein the forwarding layer is different from the RLC layer and the first MAC layer, and the first MAC layer is configured to perform tunnel processing on the data received by the forwarding layer of the relay node, wherein each of the plurality of RLC PDUs are generated according to resources allocated by the first MAC and the plurality of RLC PDUs are aggregated according to the corresponding user identifier to form a MAC PDU tunnel packet for the tunnel processing on the received data.

12. The system according to claim 11, wherein, the first MAC layer being configured to perform tunnel processing on the data received by the relay node comprises:
the data received by the relay node is a tunnel packet, the first MAC layer is configured to de-capsulate the tunnel packet received by the relay node.

13. The system according to claim 11, wherein the first protocol stack further comprises: a forwarding layer that is configured to perform data forwarding, wherein the forwarding layer is adjacent to the RLC layer.

14. The system according to claim 13, wherein, the forwarding layer is a Packet Data Convergence Protocol (PDCP) layer that is configured to define a PDCP.

15. The system according to claim 11, wherein, the relay node is one of: an access relay node or an intermediate relay node.

\* \* \* \* \*